United States Patent
Lindquist et al.

(10) Patent No.: US 8,443,410 B2
(45) Date of Patent: May 14, 2013

(54) METHOD AND A USER EQUIPMENT FOR RESERVING BANDWIDTH

(75) Inventors: Jan Erik Lindquist, Alvsjo (SE); Erik Rolin, Alvsjo (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 259 days.

(21) Appl. No.: 12/996,251

(22) PCT Filed: Feb. 2, 2009

(86) PCT No.: PCT/SE2009/050129
§ 371 (c)(1),
(2), (4) Date: Dec. 3, 2010

(87) PCT Pub. No.: WO2009/148379
PCT Pub. Date: Dec. 10, 2009

(65) Prior Publication Data
US 2011/0099595 A1     Apr. 28, 2011

Related U.S. Application Data

(60) Provisional application No. 61/059,333, filed on Jun. 6, 2008.

(51) Int. Cl.
*H04N 7/173*     (2011.01)
(52) U.S. Cl.
USPC .............................. 725/95; 725/96; 370/431
(58) Field of Classification Search ............. 725/95, 725/96
See application file for complete search history.

(56) References Cited

U.S. PATENT DOCUMENTS

| 2003/0093515 | A1 | 5/2003 | Kauffman |
| 2004/0057420 | A1* | 3/2004 | Curcio et al. ............... 370/352 |
| 2007/0011346 | A1 | 1/2007 | Kim |
| 2008/0282301 | A1* | 11/2008 | Liu et al. ................. 725/100 |
| 2009/0193469 | A1 | 7/2009 | Igarashi |
| 2010/0058422 | A1 | 3/2010 | Ochiai et al. |

FOREIGN PATENT DOCUMENTS

| JP | 2005323332 A | 11/2005 |
| WO | 2005099268 A1 | 10/2005 |
| WO | 2006084503 A1 | 8/2006 |
| WO | 2007102547 A1 | 9/2007 |
| WO | 2008088015 A1 | 7/2008 |

OTHER PUBLICATIONS

Cedervall, M. et al. "Open IPTV Forum—Toward an Open IPTV Standard." Ericsson Review No. 3, 2007.

* cited by examiner

*Primary Examiner* — Robert Hance
(74) *Attorney, Agent, or Firm* — Coats & Bennett, P.L.L.C.

(57) ABSTRACT

At a user equipment a conditional bandwidth renegotiation method is provided for managing bandwidth renegotiations when the user equipment is engaged in an IPTV session with an IPTV network and a channel switch has been requested. When it is determined that the requested channel requires less bandwidth than the presently selected channel, a conditional bandwidth re-negotiation process is initiated wherein, upon having switched to the requested channel, a timer is started. If, a timeout of the pending timer is recognized prior to another channel switch request, a band-width re-negotiation procedure is initiated, while no bandwidth re-negotiation is to be executed if another channel switch request is recognized prior to timeout of the pending timer.

18 Claims, 5 Drawing Sheets

| CHANNEL | MAX BIT-RATE | TTR |
|---|---|---|
| SVT-1 | 1500 | 25 |
| SVT-2 | 1500 | 25 |
| Canal+ | 2500 | 25 |
| TV-4 | 3000 | 25 |
| TV-3 | 2200 | 25 |

Figure 4a

| CHANNEL | MAX BIT-RATE | RESERVED MAX BIT RATE | TTR |
|---|---|---|---|
| SVT-1 | 1500 | 2000 | 25 |
| SVT-2 | 1500 | 2000 | 25 |
| Canal+ | 2500 | 4000 | 25 |
| TV-4 | 3000 | 4000 | 25 |
| TV-3 | 2200 | 4000 | 25 |

Figure 4b

METHOD AND A USER EQUIPMENT FOR RESERVING BANDWIDTH

TECHNICAL FIELD

The present invention relates generally to a method for bandwidth reservation in association with a channel switch for a user equipment engaged in an IPTV session, and a user equipment for executing the method.

BACKGROUND

As television (TV) moves from a one-way distribution service towards providing two-way interactive services to end-users, and from being limited to being distributed only to stationary locations towards being distributable practically anywhere and to services that can be watched on various types and sizes of screens, we are about to witness the birth of an entirely new mass market for TV programming, advertising, interactive games, and different types of interactive services.

Internet Protocol Television (IPTV) offers new revenue opportunities for telecommunication service providers when it comes to attracting new customers to their respective networks, in order to offset declining voice traffic revenues. Work on IPTV is underway in several different contexts, including for example the development presently in progress by Open IPTV Forum, which is specifying an end-to-end platform for supplying multimedia and IPTV services to end-users provided with IPTV enabled User Equipments (UEs) over the Internet, as well as for managed networks having controlled quality-of-service (QoS) performance. A version 1.1 specification of a functional IPTV architecture is available at www.openiptvforum.org, where the described architecture is based on the IP Multimedia Subsystem (IMS) that is specified by the Third Generation Partnership Project (3GPP). A UE can access services offered through an IMS in many different ways, both via wired access, such as e.g. via via Ethernet, a cable modem or a digital subscriber line, or via wireless access, such as e.g. via 3GPP-specified cellular radio, or by using the IEEE 802.11 or IEEE 802.16 standard.

IMS is specified in 3GPP Technical Specification (TS) 23.228 V8.4.0, IP Multimedia Subsystem (IMS) Stage 2 (Release 8), March 2008, and previous versions of TS 23.228. Furthermore, different approaches to IMS-based IPTV are described in M. Cedervall et al., "Open IPTV Forum—Toward an Open IPTV Standard", *Ericsson Review* No. 3, pp. 74-78 (2007), and in T. Cagenius et al., "Evolving the TV experience: Anytime, Anywhere, Any Device", *Ericsson Review* No. 3, pp. 107-111 (2006).

For a UE, which can be a set-top box (STB) or an entity having integrated STB capabilities, such as e.g. a computer, a TV, PDA, mobile telephone or any other IPTV enabled mobile device to access IPTV services via IMS, the UE registers in a Serving Call Session Control Function (S-CSCF), which is an IMS core node that, in essence, is operating as a SIP server. A typical IMS also includes a number of additional nodes, including a Proxy CSCF (P-CSCF), a Media Gateway Control Function (MGCF), and one or more Border Gateways (BGs), that mediate UEs access to the core nodes, and, through the core nodes, access to media content, residing on one or more media servers.

In a conventional IMS based IPTV network it is possible to perform session modifications, which may include a bandwidth reservation for the sessions that have been setup from a user equipment in order to assure that required services will be provided to the end-users. In this context a session can be a Unicasted session, such as e.g. a Video on Demand session that is delivered via a unicast stream, or a Broadcasted session, that is delivered to tuned-in end users via a multicast stream.

A bandwidth reservation procedure ensures that there are enough network resources in the last mile of the network infrastructure, or in the aggregation network, for an IPTV operator to be able to guarantee an adequate user experience with a minimal risk of disruption of a selected service.

If, for example, two sessions together exceed the amount of bandwidth available to an IP operator over the last mile the packets associated with these two sessions will compete for the available network resources, and, thus, packets of both streams will most likely be discarded, thereby resulting in decreased quality for at least one of the sessions. Once bandwidth has been reserved for one or more sessions it is important that no new session is allowed to have a negative impact on the existing sessions.

FIG. 1 is a signaling scheme according to the prior art, illustrating how a typical IPTV service setup may be executed between a UE 100 and an IPTV Network 102, providing one or more IPTV services to UE 100, via an IMS network, represented by Core Network 101 in the figure.

It is to be understood that, although both the IPTV Network 102 and the IMS network, represented by IMS Core Network 101 typically comprise a plurality of network nodes, for simplicity reasons, each of these networks have been represented by one respective node in FIG. 1.

In two initial steps 1:1 and 1:2, UE 100 registers with IMS core network 101, which responds, typically with a 200 OK message. In subsequent steps 1:3-1:6, UE 100 requests for an IPTV service to be provided from IPTV network 102, via a SIP subscribe. Once this procedure has been completed, typically by UE 100 receiving a 200 OK message from the IMS core network 101, as indicated with step 1:6, UE 100 has been provided with IPTV service data, typically referred to as IPTV service discovery data, including a channel list, which indicates all channels that can be provided from the respective IPTV service provider of IPTV network 102. A typical IPTV service discovery signaling procedure is illustrated with steps 1:7-1:10 in FIG. 1. Once provided with information about the available channels, UE 100 may choose to select a required service. In the present example this is illustrated with a HTTP GET message that is sent from UE 100 to the IPTV network 102 via IMS core network 101 in a step 1:11.

In a subsequent step 1:12, IPTV network 102 responds by providing UE 100 with a list, typically referred to as a linear TV channel list, which, among other IPTV channel related information comprises bandwidth requirement information associated with IPTV channels that are available from IPTV network 102. This information is provided to UE 100 as a TISPAN service package, typically referred to as a Broadcast offering of a Broadcast Discovery record.

A broadcast offering typically comprise a number of elements, or attributes, each of which is carrying different kinds of information about the available IPTV channels. For each channel the broadcast offering may comprise information such as e.g. a DVB Triplet, which enables IPTV channel identification at the UE; a textual identity, which represents a respective IPTV channel name; a service location, which is an instruction on where to find the respective channel, and maximum bit rate, which is an indication of the maximum bit rate that is required for a respective service.

In a next step 1:13, the information provided from the broadcast offering is stored in a memory of UE 100. At this stage an end-user of UE 100 may choose to select a preferred IPTV channel from the channels available in the broadcast offering, typically by activating a remote control, or via another user interface that is associated with UE 100. In a step 1:14, an end-user makes such a selection, and in response to a channel selection UE 100 initiates a bandwidth reservation procedure in order to reserve appropriate bandwidth for the selected channel. In the figure this is illustrated with an invitation, typically referred to as a SIP Invite, that is forwarded to IMS core network 101, as indicated in another step 1:15.

If the required bandwidth is not available, or if the required bandwidth for any other reason cannot be allocated to UE 100 this is notified to UE 100, as indicated with a step 1:16a. In such a situation, the end-user may choose to make another re-try for the same channel, or try to select another channel.

If, however, the bandwidth request is approved with by the IMS network, the bandwidth is reserved to UE 100, as indicated with another step 1:16b. The bandwidth reservation procedure is then completed by informing IPTV network 102 of the allocated bandwidth and by IPTV network 102 confirming that information, as indicated with step 1:17 and subsequent step 1:18, and a confirmation is also executed towards UE 100, as illustrated with step 1:19 and subsequent step 1:20.

With the required bandwidth reserved to UE 100, the requested IPTV service can now be initiated. In the present example this is done by UE 100 transmitting an IGMP Join, to IPTV network 102, as indicated with a step 1.21. As illustrated in the figure, IPTV network 102 responds to such a service request by delivering the chosen IPTV channel to UE 100 via a multicast stream, as indicated with a final step 1:22.

A general problem with bandwidth reservations is how to gain appropriate information on how much bandwidth that will actually be necessary to negotiate for a selected broadcast session. As mentioned above, the broadcast channel information necessary for setting up an IPTV session available from an IPTV operator, which is typically delivered in a Broadcast Offering, may comprise an indication of a maximum bit rate for the respective IPTV channels. Such information has a purpose of ensuring that the adequate bandwidth will be available from the IMS core network 101 once resources have been allocated and an IPTV channel has been selected.

A problem with basing a bandwidth re-negotiation procedure on the maximum bit rate attribute, according to the procedure described above is, however, that the required signaling will cause processing delays which may diminish the user experience for a user that is switching between different channels. Before an end-user can view a selected channel a session modification, which may comprise a bandwidth re-negotiation, has to take place, and, as a consequence from such a bandwidth re-negotiation, the end-user will experience a delay before the channel can actually be viewed.

The problem addressed above is particularly annoying when an end-user is swapping between different channels for which different maximum bit rates have been appointed, before deciding to watch one of the available channels on a more permanent basis. Repeated delays may be very annoying to the end-user, while at the same time, from an operators point of view, there may also be little to be gained by initiating bandwidth re-negotiations immediately in response to a channel switch, initiated by an end-user.

In addition, presently known solutions for performing bandwidth re-negotiations also fail to give the IPTV operator any control whatsoever over the usage of the available bandwidth.

SUMMARY

The object of the present invention is to provide a method for reducing the number of bandwidth re-negotiations for a user equipment that is engaged in an IPTV session. More specifically, this document refers to a mechanism that under certain circumstances allows a decision of whether or not to perform a bandwidth reservation in association with a channel switch for a user equipment engaged in an IPTV session to be postponed. By postponing such a decision for a channel switch from a channel having higher bandwidth requirements that the channel to which a switch is required, the number of bandwidth re-negotiations that are actually being executed may be reduced, without having to effect neither the user experience, or the network performance negatively.

According to a first aspect, a method of managing bandwidth re-negotiations in association with channel switching at a user equipment that is engaged in an IPTV session provided from an IPTV network is provided.

A conditional bandwidth re-negotiation process associated with a requested channel switch is applied when it has been determined that a requested channel requires less bandwidth than the presently selected channel. Such a conditional bandwidth re-negotiation process comprises an execution of a number of steps starting with a switching to the requested channel, followed by starting a timer. The timer has the purpose of delaying a decision of whether a bandwidth re-negotiation is to be executed or not. If a timeout is recognised a bandwidth re-negotiation is initiated and executed, typically according to conventional procedural steps.

If another channel switch request is recognised prior to a timeout of the timer, no bandwidth re-negotiation will be executed for the former channel switch, and, thus, the pending timer is terminated, before another evaluation process is initiated for the purpose of determining if a conditional bandwidth re-negotiation process is to be applied also in response to the latest channel switch request.

According to the suggested method, the bandwidth requirements on which the conditional bandwidth re-negotiation procedure rely are evaluated by comparing a value of a bit rate attribute which is associated with the requested channel and which corresponds to the bandwidth required for the requested channel with a value, indicating the maximum bit rate presently available to the user equipment and corresponding to the bandwidth allocated to the present channel.

In a typical embodiment, the bit rate attribute has been provided to the user equipment from the IPTV network prior to the channel switch. This may be achieved by forwarding the bit rate attribute, typically together with other bit rate attributes, in a broadcast offering. Bit rate attributes provided to the user equipment may be pre-defined either on a per channel basis, or on a per channel group basis. If pre-defined on a per channel group basis, such a grouping may have been based on one or more different criteria.

Also the timer value used for the conditional bandwidth re-negotiation procedure, may typically have been provided to the user equipment from the IPTV network. Such a timer value may be a value that has been specified to be valid for all channels provided from the IPTV network, or as a channel specific timer value that has been predefined for a specific channel. Also the timer value, may have been provided to the user equipment in a broadcast offering.

According to another aspect, the claimed invention also refers to a user equipment configured to execute the method described above.

The suggested method provides a mechanism for limiting the number of bandwidth re-negotiations which is easy to implement in a user equipment.

The suggested method also enables the operator, at least to a limited extend, to effect how the available resources will be allocated, during upcoming bandwidth re-negotiations. Further details and features of the suggested method and associated user equipment, as well as its benefits, will be explained in further detail in the detailed description.

BRIEF DESCRIPTION OF THE DRAWINGS

The present invention will now be described in more detail by means of exemplary embodiments and with reference to the accompanying drawings, in which:

FIG. 4a is a table, exemplifying information on the basis of which the method described with reference to FIG. 2 may be performed, according to one embodiment.

FIG. 4b is another table, exemplifying information on the basis of which the method described with reference to FIG. 2 may be based, according to another embodiment.

DETAILED DESCRIPTION

Figure 1:
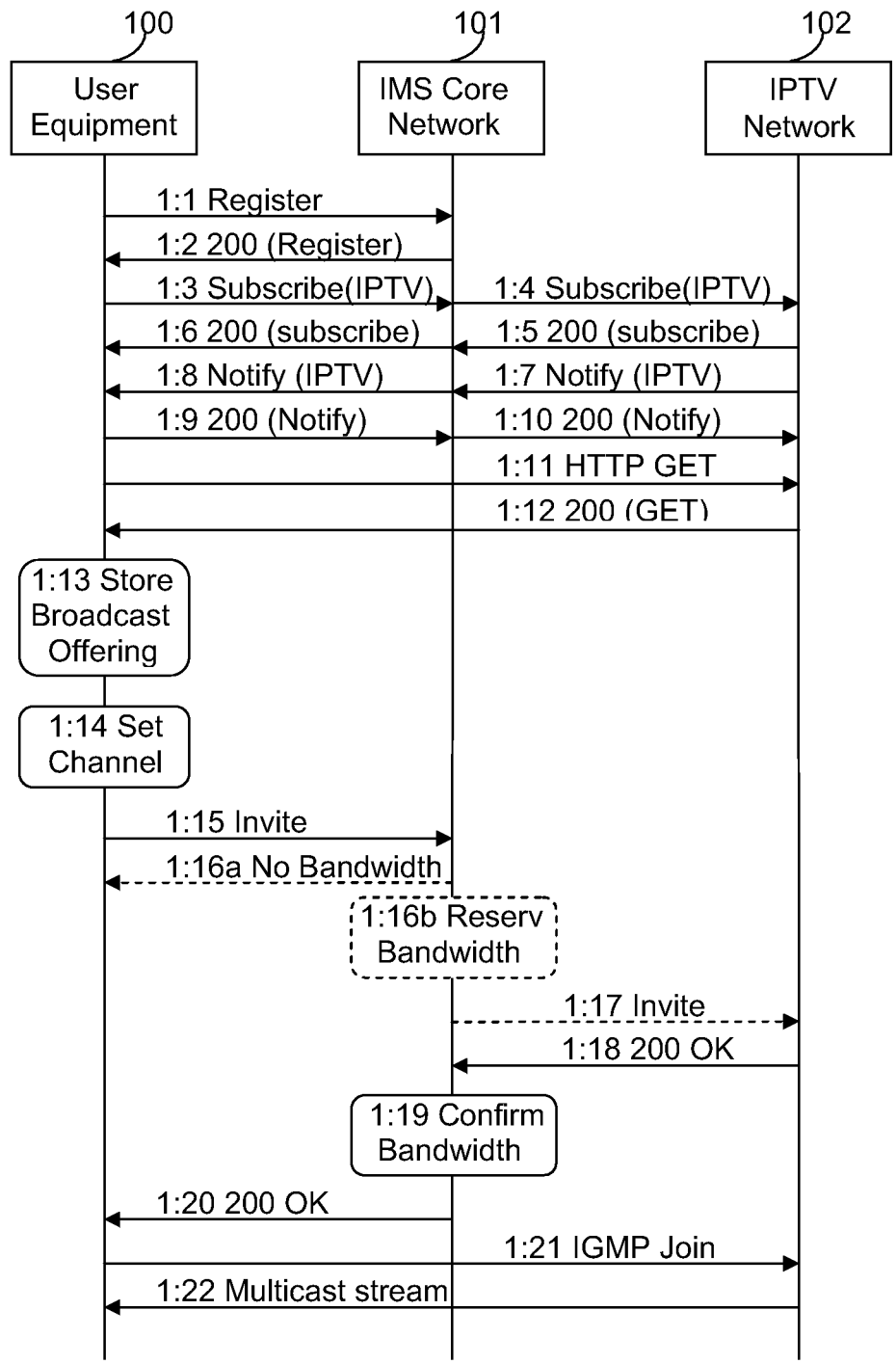
FIG. 1 is a signaling diagram illustrating how an IPTV session may be set-up between a user equipment and an IPTV network according to the prior art.

As has already been discussed above, a certain amount of bandwidth requirements needs to be defined for available IPTV channels in order for an IMS core network to be able to perform a bandwidth reservation for a UE requiring an IPTV session to be set up with an IPTV network.

The information that is available for this purpose today is the metadata that has been provided to a UE from the IPTV network in a broadcast offering and that gives an indication of what bit rate that has to be available for the respective session, i.e. the bit rate that has to be guaranteed for a respective IPTV channel, before the respective session can be setup.

What should also be apparent from above is that from an end-user perspective, re-negotiating the bandwidth on a per channel basis is something that to the largest extent should be avoided, since a channel can only be viewed after the bandwidth required for a selected channel has been granted for a respective UE.

What is required is therefore a method for limiting the number of executed re-negotiations. One approach is to try to avoid what could be considered as unnecessary bandwidth re-negotiations to be executed. Therefore, a bandwidth re-negotiation method which apply conditional re-negotiations, and, thus, which decreases the number of delays introduced by complete re-negotiation procedures, is suggested.

It is also required that the IPTV operator that is providing IPTV services to end-users in the form of IPTV channels via an IPTV network, at least to some extent, can gain more impact on how the available resources, or more specifically, the available bandwidth, is used for the IPTV service distribution.

According to a suggested conditional bandwidth re-negotiation method bandwidth is negotiated for a group of channels rather than for a single channel, such that when an end-user is zapping between different IPTV channels, the decision as to whether a bandwidth re-negotiation is actually necessary to execute may at some occasions be postponed. By postponing the decisions, it will be possible to determine that at some instances bandwidth re-negotiation is not necessary, and, thus, the amount of delays caused by executed bandwidth re-negotiation procedures may be reduced.

In order to gain better control over the bandwidth re-negotiations according to the suggested method, a timer is introduced at the UEs. The timer value will preferably be provided to the UE from the IPTV operator. For that reason a new element or attribute, representing one or more timer values, which from hereinafter will be referred to e.g. as TimeToRe-negotiation (TTR), is introduced.

In this context TTR is an attribute that is provided to a UE, typically via a broadcast offering, prior to a channel switch. TTR can be used for delaying a decision as to whether a bandwidth re-negotiation procedure is to be executed or not at a UE, instead of executing a bandwidth re-negotiation procedure unconditionally, in response to a channel switch initiated by an end user of the UE.

A bandwidth re-negotiation procedure that is required due to the fact that an end-user has switched channel to a channel that require less bandwidth than the channel that is presently viewed is not time critical, since also without the execution of a re-negotiation it will be possible to provide the required new channel to the end-user, by using the bandwidth already reserved for the UE.

In such a situation, a bandwidth re-negotiation decision may therefore, without diminishing the user experience, be delayed on the basis of a specific timer value, specified e.g. by TTR, thereby, allowing a postponed re-consideration as to whether a re-negotiation procedure will actually be necessary, depending on whether any subsequent, additional requested channel switch will occur before expiry of the timer value.

More specifically, the suggested method will be configured such that if a switch to another channel is chosen before timer timeout, the timer will be reset and started once again for the most recent switch, in case a corresponding scenario appears also for the latest channel selection, i.e. if also the latest chosen channel require less bandwidth than the most previously chosen channel.

If, on the other hand, more bandwidth is required by the recently selected channel then the presently viewed channel, a conventional bandwidth re-negotiation procedure is initiated and executed instantly.

Consequently, by introducing such a conditional bandwidth re-negotiation procedure, a re-negotiation procedure involving a switch to a channel requiring lower bandwidth will only be executed if no subsequent channel switch is recognised prior to timer timeout for a viewed channel.

As already mentioned, the timer value to be applied may be selected to an appropriate value by the IPTV operator, and may be chosen from a range starting at a relatively low value, such as e.g. 5 seconds up to a value in the range of minutes, such as e.g. a timer value having a duration of 5 minutes.

How the timer value is chosen may depend on one or more different criteria, such as e.g. user behaviour, number of available channels and/or available bandwidth.

As an alternative to defining a timer attribute as one singe value that is valid for all channels provided by the IPTV operator, the timer attribute may instead be defined as a vector, for which different timer values have been appointed for different channels, or groups of channels. If the timer attribute differs for different channels it may be chosen depending on criteria such as e.g. how popular a respective channel is, type of channel, or the estimated user behaviour of a respective channel.

A timer value may for example have a lower value specified for more popular channels, while a higher timer value is chosen for less popular channels, in order to optimise the re-negotiation process even further.

By introducing the proposed timer-based conditional bandwidth re-negotiation mechanism, the number of bandwidth re-negotiations may be reduced, and only on those occasions when it is determined that an end-user has maintained a respective selected channel tuned for a specific duration of time, i.e. for the duration of the relevant timer value, a bandwidth re-negotiation will actually commence.

One way of implementing such a mechanism in a UE, according to one exemplary embodiment, will now be described in more detail with reference to the flow chart of FIG. 2.

It is to be understood, that the described flow chart merely describes one possible way of determining when, if at all, to commence a bandwidth re-negotiation procedure, and that a mechanism which is based on the general principals discussed above may be applied also by way of other alternative ways of implementation.

As a prerequisite it is assumed that an end-user is tuned to an IPTV channel and that a conditional bandwidth re-negotiation function has been started at the UE, which typically may be e.g. any of a computer, a PDA, a set top box or a TV comprising set top box functionality, or a mobile telephone or any other type of mobile device that is configured to request and display one or more IPTV services/IPTV channels. Starting of such a conditional function is indicated with a first step 200.

In a next step 201 it is determined if a channel switch has been requested by an end-user. Once a requested channel switch has been recognised by the UE, it is determined whether the bandwidth required by the selected channel equals the bandwidth required by the currently viewed channel, i.e. the bandwidth already allocated to the UE, and, thus, if a switch to the new channel can be executed without requiring any bandwidth re-negotiation. This condition is evaluated in a step 202, and, if it is found that the required bandwidth remains unchanged, a channel switch will be executed in a next step, as indicated with a subsequent step 203. After the channel switch has been executed, the described loop is repeated, starting with awaiting yet another channel switch to commence, at step 201.

However, if the bandwidth requirement is different for the different channels, another evaluation step commences, as indicated with a next step 204. In this second evaluation step it is determined whether the bandwidth required by the selected channel is lower that the bandwidth required by the current channel. If this is not the case, i.e. additional bandwidth is required in order to be able to provide the selected service/channel to the end-user, an unconditional re-negotiation procedure will be executed, typically according to conventional procedures, as indicated with a next step 205, before the requested channel change is performed, as indicated with step 203, after which the loop is restarted once again, starting at step 201.

If, however, it is instead determined that there are presently more bandwidth allocated than what will be required by the selected channel, the suggested method instead continues by executing the requested channel switch, as indicated with a step 206, and in association with the channel switch, by starting a timer which is set to a duration of a predefined timer value, specified for the selected channel, or for a group of channels to which the respective channel belongs, as indicated with a subsequent step 207.

The timer will be running as long as no new channel switch is initiated by an end-user, as indicated with the loop comprising step 208 and the "no" branch (208b), continuing at a subsequent step 210. As indicated in the described loop, if a new channel switch occurs prior to timer timeout, i.e. in accordance with the "Yes" branch of step 210 (210a), the delayed bandwidth re-negotiation decision relying on the presently running timer is now taken by considering a bandwidth re-negotiation to no longer be required for the previous channel switch, and, thus, the next activity following such a decision will therefore be to reset the pending timer associated with the previous channel switch, as indicated with a step 211, before the conditions for the latest requested channel switch are considered, starting at step 202.

If instead, timer timeout occurs before any new channel switch has been activated by an end-user, as indicated with the "yes" branch (208a) of step 208, a bandwidth re-negotiation is set to commence for the recently requested channel switch, typically according to conventional bandwidth re-negotiation procedures, as indicated with another step 209.

According to one embodiment, the bandwidth requirements evaluation procedures, executed at step 202 and 204 may be executed by way of comparing the relevant value of the maximum bit rate attribute, that has been specified for the selected channel and the current channel, respectively, and that has been provided to the UE, e.g. via a broadcast offering.

Exemplified scenarios describing how a UE may execute a conditional bandwidth re-negotiation procedure, such as the one described above with reference to FIG. 2 will now be described with reference to the signaling diagram of FIG. 3.

Figure 3:
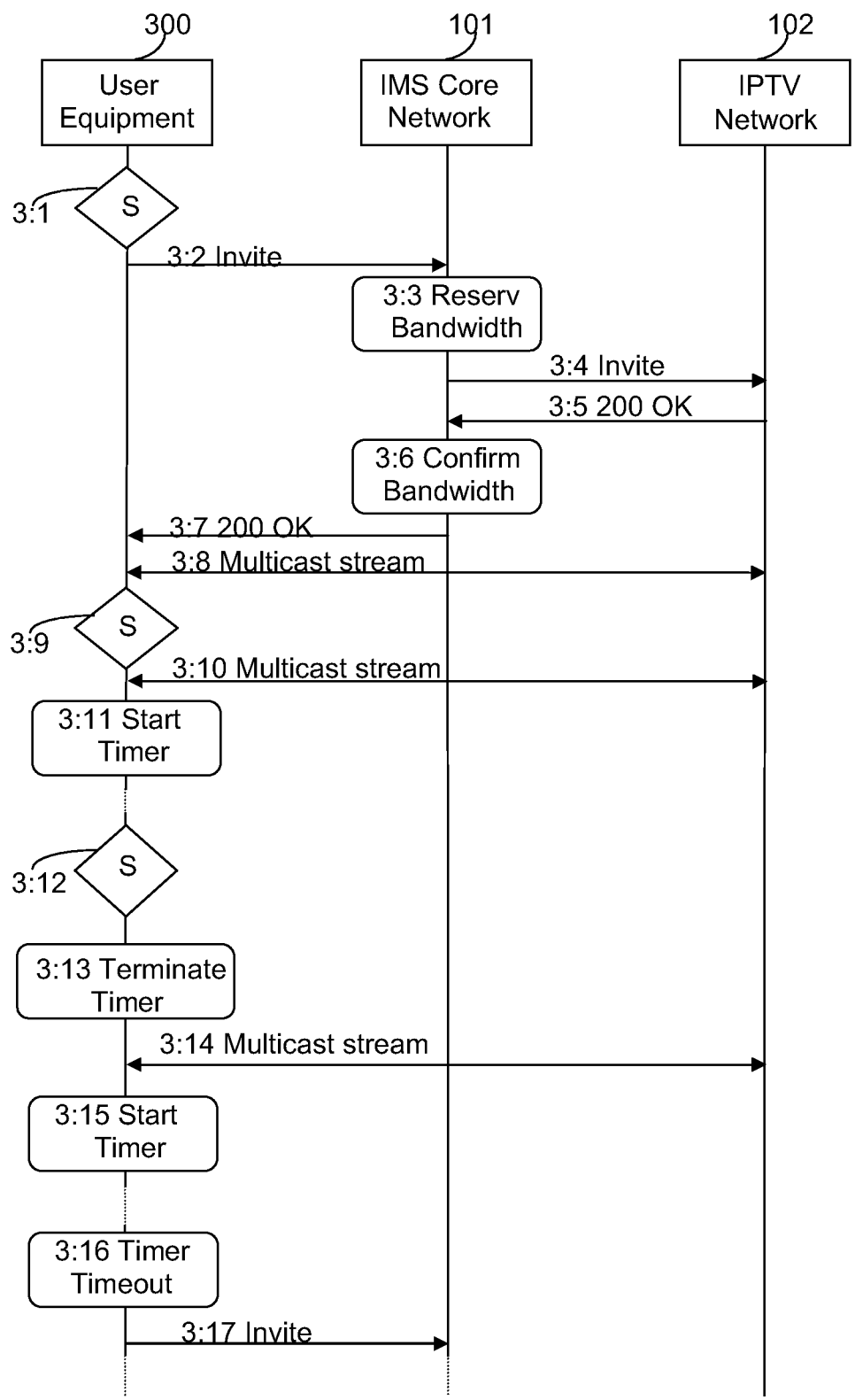
FIG. 3 is a signaling diagram illustrating how a user equipment may apply the method described with reference to FIG. 2, according to a series of exemplified scenarios.

It is to be understood that FIG. 3 is a simplified, schematic signaling scheme, where focus lie on showing the differences between different channel switching situations, where a conditional bandwidth re-negotiation procedure according to principles described above has been applied. In the figure, different occasions where the suggested conditional bandwidth re-negotiation procedure is to be activated, are indicated with a symbol marked "S".

Figure 2:
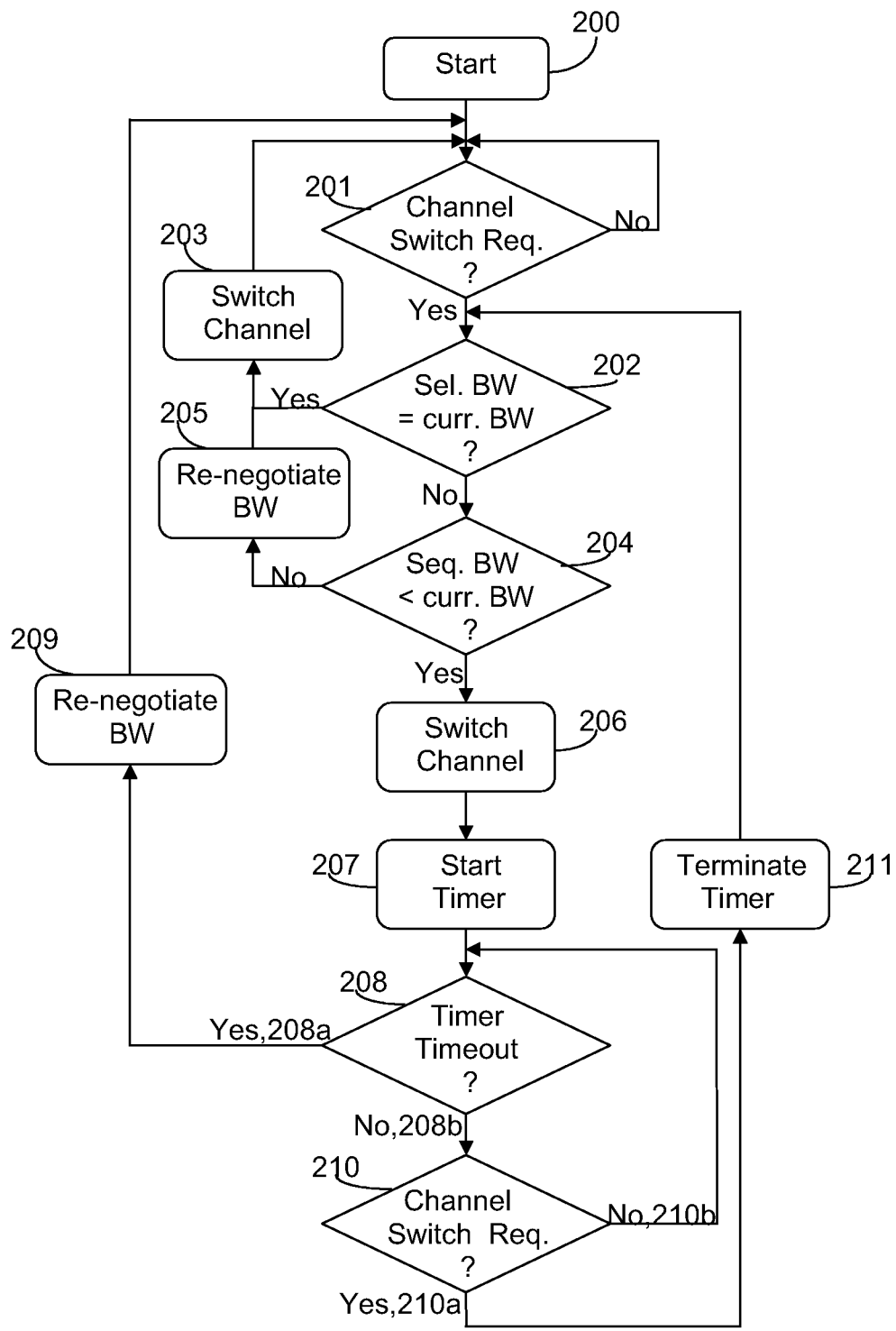
FIG. 2 is a flow chart illustrating a method of delaying the decision as to whether a bandwidth re-negotiation procedure is to be executed or not, according to one exemplary embodiment.

For simplicity reasons, subsequent to an initiation of a conditional re-negotiation procedure, only the steps which are important for a fully understanding of the general principles for the suggested conditional bandwidth re-negotiation procedure that will be executed in response to different alternative scenarios will be shown in the figure, while a complete procedure applicable for all the described scenarios may be identified by following the flow chart of FIG. 2 and the accompanying text above As a prerequisite, also for this figure it is assumed that a UE 300 that is adapted to apply a conditional bandwidth re-negotiation procedure is connected to an IPTV network 102 via an IMS network, represented by IMS Core Network 101, and is engaged in an IPTV session, i.e. an IPTV channel is presently presented on the UE 300.

In a first step 3:1 an end-user is actively switching channel, typically by activating a remote control in a conventional manner, and, as a consequence, a conditional bandwidth re-negotiation procedure is initiated. In this particular case it is assumed that the requested channel requires more bandwidth than what is allocated for the presently selected channel, and, thus, instead of delaying the bandwidth re-negotiation decision, a bandwidth re-negotiation, which typically comprises the execution of steps 1:15-1:20 described above with reference to FIG. 1, will commence. In FIG. 3, these steps are represented by the corresponding steps 3:2-3:7.

Once the bandwidth re-negotiation procedure has been successfully completed, the selected program can be shown to the user via the respective IPTV channel, i.e. the steps corresponding to steps 1:21 and 1:22 of FIG. 1 will be executed. In the present example, these steps are represented by step 3:8 in FIG. 3.

Once the user chooses to select another channel, a new conditional bandwidth re-negotiation procedure will be initiated, as indicated with another step 3:9. In this case, however, it is instead assumed that the present bandwidth exceeds the bandwidth required for the selected channel, and, thus, a channel switch may be executed, without having to decide whether or not to execute any bandwidth re-negotiation procedure instantly. Accordingly, a channel switch is executed and the requested IPTV service is provided to UE 300, as illustrated with a next step 3:10. Once the channel has been selected, however, a timer, and thereby also a procedure for delaying a bandwidth re-negotiation decision, is started, as indicated with a next step 3:11.

After some time has elapsed it is assumed that the end-user makes another channel switch, which starts yet another conditional bandwidth re-negotiation procedure, as indicated with a subsequent step 3:12, corresponding to step 210 of FIG. 2.

It is assumed that the new channel selection occurs prior to a timeout of the timer that was triggered by the previous channel switch initiated at step 3:9, and, thus, it is determined that a bandwidth re-negotiation for the channel selected in step 3:9 will not be necessary to execute. Consequently, the pending timer is terminated, as indicated with step 3:13, before it is once again determined whether a delayed bandwidth renegotiation is to be executed, or whether an immediate, unconditional bandwidth re-negotiation is instead to be started.

Also this time it is assumed that the present bandwidth exceeds the bandwidth required by the requested channel, and, thus, the requested channel can be provided to the user, as indicated with a step 3:14, and corresponding to step 206 of FIG. 2, before another timer, and another delayed bandwidth re-negotiation procedure is started, as indicated with a step 3:15 (corresponding to step 207 of FIG. 2).

The latest scenario may express the event that a user is switching between different channels in order to orient himself of available programs, but without deciding to choose to continue to watch any of the programs. In such a situation a bandwidth re-negotiation would cause unnecessary delays, especially when considering that little is gained by the operator from the point of view of striving to achieve efficiently use of the allocated bandwidth.

This time, however, it is assumed that no new channel is selected before timeout of the timer initiated at step 3:15. This is indicated with the timer timeout, of another step 3:16. As a consequence from the timeout, a bandwidth re-negotiation procedure will now be initiated, since it is now more likely that the user will remain connected to the present channel, and, thus, that UE 300 will be able to continue to receive the selected IPTV channel, using a lower bandwidth allocated to it. Such an initiation step, which is indicated with a step 3:17 in FIG. 3, corresponds to step 1:15 of FIG. 1, and the "yes" branch of step 208 in FIG. 2. Subsequent to this step a bandwidth re-negotiation procedure, corresponding to steps 1:16*a* or 1:16*b* to 1:20 of FIG. 1 will commence (not shown).

As already mentioned above, a conditional bandwidth re-negotiation procedure, such as the one suggested in this document, is based on a specified bandwidth requirement. As was also already mentioned above, such information may be provided to a UE from an IPTV network providing one or more IPTV services, typically via a broadcast offering.

FIG. 4*a* is an exemplified table 400*a*, illustrating how information to be provided to a UE for the purpose of forming input data for a conditional bandwidth re-negotiation procedure may be configured, typically by an operator. The table 400*a* comprise an indication of maximum bit rates, listed in a "max bit-rate" column 402, each of which have been specified for a respective IPTV channel, listed in a "channel" column 401. Table 400*a* also comprise timer values specified for each channel, listed in a "TTR" column 403.

As indicated above, a maximum bit rate attribute is normally provided to a UE in a broadcast offering, e.g. according to known Open IPTV Forum standards. In addition to this information one or more relevant timer values may be provided to the UE, e.g. in a new TTR attribute of the broadcast offering.

Alternatively, another variable, which may instead be an indication of a maximum bit rate for a specified group of channels, here referred to as a reserved maximum bit rate, and indicated in a "reserved max bit rate" column 404, may be defined and used for the described purpose. Table 400*b* is an exemplified illustration of a possible configuration, where a plurality of channels, each of which having an associated max bit rate appointed to it, have been grouped into one of two groups.

In a typical embodiment, either a max bit rate attribute 402, if individual bit rates are to be considered, or a reserved max bit rate attribute, if grouped bit rates are to be considered, is provided to the UE, together with a TTR attribute. The conditional bandwidth re-negotiation procedure will then rely on the values provided in the received bit rate attribute and TTR attribute.

The main purpose with introducing the reserved max bit rate is to enable grouping of different categories of channels on the basis of bandwidth requirements that has been specified for the channels.

In FIG. 4*b*, this is exemplified by the two channels SVT-1 and SVT-2 that have been grouped together, by giving this group a common reserved maximum bit rate value, while canal+, TV-4 and TV-3 have been grouped together and appointed another, higher reserved maximum bit rate value.

If the evaluation steps which were illustrated as steps 202 and 204 in FIG. 2, are to be based on reserved maximum bit rate values, which have been specified according to pre-defined strategies, such as e.g. on the basis of end-user behaviour patterns, the number of initiated bandwidth re-negotiation procedures may be reduced even more than if bit rate requirements are specified on a per channel basis, i.e. according to max bit rate-attribute appointed to individual channels, since, as long as a selected channel belongs to the same group as the present channel, no new bandwidth re-negotiation will be required.

The respective maximum bit rate values and/or reserved maximum bit rate values may be specified by the operator and chosen according to one or more predefined criteria, thereby enabling the operator at least some control of how the bandwidth is used for distribution of the IPTV channels.

The implementation of the suggested timer based conditional bandwidth re-negotiation mechanism does not require any major amendments to be made on the IPTV network side, and, as will clearly show below, will also only require minor amendments to the UEs that are configured to apply such a mechanism.

A UE that is configured to apply a mechanism, such as the one described above according to a simplified, exemplary embodiment will now be described with reference to FIG. 5.

Figure 5:
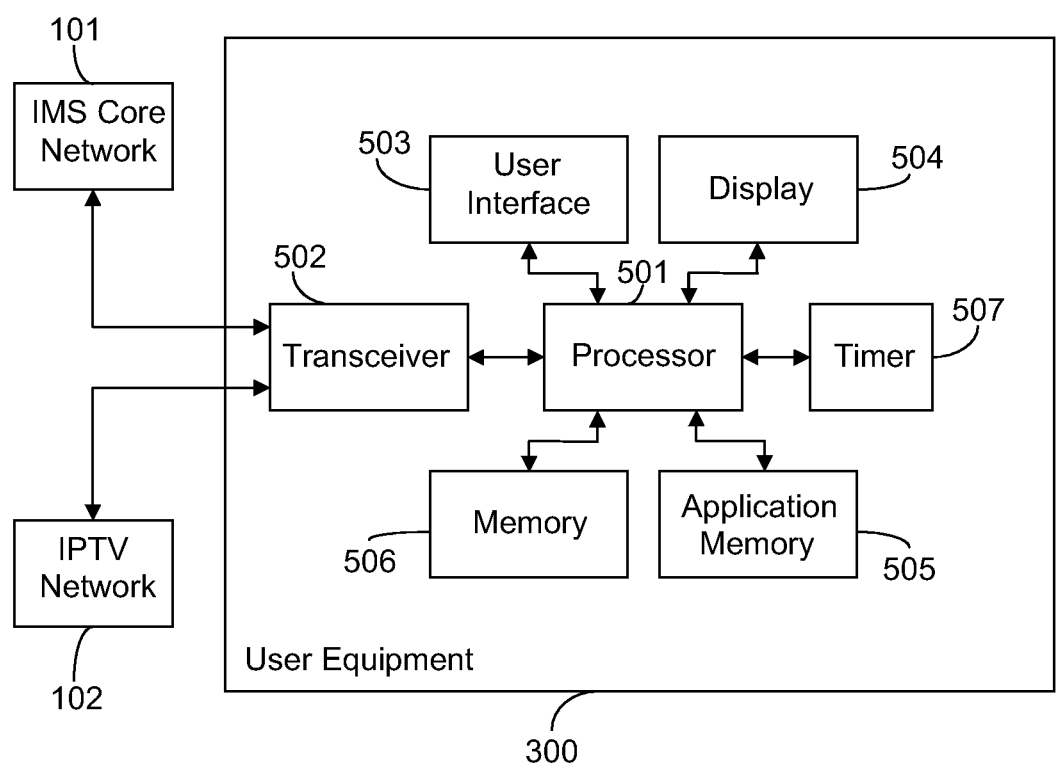
FIG. 5 is a simplified block scheme, illustrating how a user equipment that is able to execute the method described with reference to FIG. 2 may be configured, according to one exemplified embodiment.

The UE 300 of FIG. 5 comprises a processor 501, which may include one or more sub-processors, and which is configured to manage one or more software modules and/or applications, in order for the UE to be able to carry out the operations and procedures described above, as well as any other conventional operations, which typically are run on the proposed type of communication entities.

The UE 300 includes a transceiver 502 that is suitable for exchanging information with one or more network entities, represented by IMS core network 101 and to communicate with an IPTV operator, represented by IPTV network 102 in the figure.

User input can be provided to the UE 300 via a User Interface (UI) 503, which may have been integrated with the UE 300, or configured as a part of a separate entity, such as e.g. a remote control. The UE 300 also comprises a display 504 for presenting information associated with IPTV setup, as well as IPTV media content, to an end-user. Alternatively, if the UE 300 has touch-screen capabilities, the display 504 may be configured as a display that is integrated with the user interface 503.

Software applications of UE 300 are typically stored in an Application Memory 505, and information, such as e.g. broadcast offerings, may be downloaded and/or cached in, and later retrieved from, a separate memory 506.

Finally, UE 300 also comprises a timer 507, that is adapted to run on the basis of a predefined timer value, which may have been provided to the UE 300 from the IPTV network, e.g. via a TTR attribute forwarded in a broadcast offering.

By re-negotiating bandwidth for multiple channels or groups of channels it will be possible for an operator to effect the optimization of the reservation of resources that are available for IPTV services offered by the operator. The optimization may be applicable by negotiating the bandwidth for a separate channel, or for a group of channels. If, for example, bandwidth has been negotiated for a group of channels with standard definition (SD) and a user then selects a high definition (HD) channel, a session modification, comprising a bandwidth re-negotiation, will be executed for that group of channels, when a user has selected to do a channel switch between channels belonging to different channel groups. A session will then be setup with the maximum bandwidth/bit rate specified for the respective group, and if later on a user selects a channel of a different group then a new maximum bandwidth/bit rate will instead be specified.

The suggested timer based mechanism is based on a very simple and straightforward solution that may easily be implemented in various types of both stationary and mobile equipment.

By introducing two new attributes, providing predefined bit rate values and one or more delay values to a UE in a broadcast offering, information necessary for the purpose of performing bandwidth reservation for single channels, or for a group of channels, will be easy to manage, since this input data will be easily retrievable.

There will be no need to parse the maximum bandwidth requirements for all channels, but simply to look up the respective field in the broadcast offering information stored at a UE, when determining whether a bandwidth re-negotiation decision should be postponed or not.

The IPTV Operators will gain at least some control over how bandwidth reservation is handled in the access line, without thereby requiring any extra signaling when switching between channels, that has only slightly different bandwidth characteristics.

Support of HD channels can also be provided without requiring reservation for a channel on a permanent basis. Again with the conditional timer based re-negotiation method, the operator has to its disposition a clear means of controlling bandwidth reservation for the HD channel.

The suggested mechanism also provides support of Picture & Picture, which typically requires a small bandwidth as well as of mosaic type views, where multiple streams are presented on one single display. Through the suggested method many multicast streams may be setup and clear bandwidth requirements may be used. Typically such streams are considered as SD either or HD streams which is incorrect for such a scenario, where access equipment, such as e.g. DSLAM may assume that 3 streams represent a limit, when actually potentially as much as 15 such small streams can be supported. Such deficiencies can be handled by the suggested method, due to the resulting reduced number of bandwidth re-negotiations.

In addition, while the invention has been described with reference to specific exemplary embodiments, the description is generally only intended to illustrate the inventive concept and should not be taken as limiting the scope of the invention, which is defined by the appended claims.

Abbreviations
BG Border Gateway
DSLAM Digital Subscriber Line Access Multiplexer
IMS IP Multimedia Subsystem
IPTV Internet Protocol Television
HD High Definition
MGCF Media Gateway Control Function
P-CSCF Proxy—Call Session Control Function
S-CSCF Serving—Call Session Control Function
SD Standard Definition
STB Set-Top-Box
UE User Equipment

The invention claimed is:

1. A method at a User Equipment for managing bandwidth re-negotiations in association with channel switching when said User Equipment is engaged in an Internet Protocol Television (IPTV) session on a first channel provided from an IPTV network, the method comprising applying a bandwidth re-negotiation procedure associated with a requested switch to a requested channel if the requested channel requires less bandwidth than the first channel, the bandwidth re-negotiation procedure comprising switching from the first channel to the requested channel, starting a timer to a specific timer value, TTR, delaying bandwidth re-negotiation associated with said switching until timeout of the timer, and re-starting the timer to the specific timer value, TTR, if an additional channel switch is requested before timeout of the timer.

2. A method according to claim 1, further comprising terminating said timer prior to timeout of the timer in response to recognizing said additional channel switch request.

3. A method according to claim 2, further comprising, subsequent to terminating said timer, determining if a bandwidth re-negotiation procedure is to be applied also in response to said additional channel switch request.

4. A method according to claim 1, further comprising evaluating bandwidth requirements for the requested switch by comparing a value of a bit rate attribute, associated with the requested channel and corresponding to the bandwidth required for the requested channel, with the maximum bit rate presently available to the User Equipment and corresponding to the bandwidth allocated to the present channel.

5. A method according to claim 4, wherein said bit rate attribute is provided to the User Equipment from said IPTV network.

6. A method according to claim 4, wherein said bit rate attribute is provided to the User Equipment in a broadcast offering.

7. A method according to claim 4, wherein said bit rate attribute comprises bit rate values that have been pre-defined on a per channel basis.

8. A method according to claim 4, wherein said bit rate attribute is a MaxBitrate attribute provided to the User Equipment from said IPTV network according to Open IPTV Forum standards.

9. A method according to claim 4, wherein said bit rate attribute is a new attribute comprising values that have been pre-defined on a per channel group basis.

10. A method according to claim 1, wherein said specific timer value, TTR, is provided to the User Equipment from said IPTV network.

11. A method according to claim 10, wherein said specific timer value, TTR, is a common timer value that has been predefined for all channels provided from said IPTV network.

12. A method according to claim 10, wherein said specific timer value, TTR, is a channel specific timer value that has been predefined for a specific channel.

13. A method according to claim 10, wherein said specific timer value, TTR, is a group specific timer value that has been predefined for a specific group of channels.

14. A method according to claim 10, wherein said specific timer value, TTR, is a new attribute that is provided to the User Equipment in a broadcast offering.

15. A User Equipment for managing bandwidth renegotiations in association with channel switching when said User Equipment is engaged in an Internet Protocol Television (IPTV) session on a first channel provided from an IPTV network, said User Equipment comprising a processor configured to apply a bandwidth re-negotiation procedure associated with a requested switch to a requested channel if the requested channel requires less bandwidth than the first channel, the processor configured to apply that bandwidth re-negotiation procedure by starting a timer to a specific timer value, TTR, when a switch from the first channel to the requested channel is performed, delaying execution of bandwidth renegotiation associated with said switching until timeout of the timer, and restarting the timer to the specific timer value, TTR, if an additional channel switch is requested before timeout of the timer.

16. A User Equipment, according to claim 15, wherein the processor is configured to:
   terminate said timer prior to timeout of the timer in response to recognizing said additional channel switch request; and
   subsequent to terminating said timer, determine if a bandwidth re-negotiation procedure is to be applied also in response to said additional channel switch request.

17. A User Equipment according to claim 15, wherein said processor is further configured to evaluate bandwidth requirements for the requested switch by comparing a bit rate value of a bit rate attribute, associated with the requested channel and corresponding to the bandwidth required for the requested channel, with the maximum bit rate presently available to the User Equipment and corresponding to the bandwidth allocated to the present channel.

18. A User Equipment according to claim 15, wherein said User Equipment is any of: a set top box; a Personal Digital Assistant (PDA); a television (TV), a computer or a mobile telephone.

* * * * *